No. 894,493. PATENTED JULY 28, 1908.
E. A. & C. A. GARVEY.
PNEUMATIC CUSHION FOR VEHICLES.
APPLICATION FILED JAN. 9, 1908.
2 SHEETS—SHEET 1.
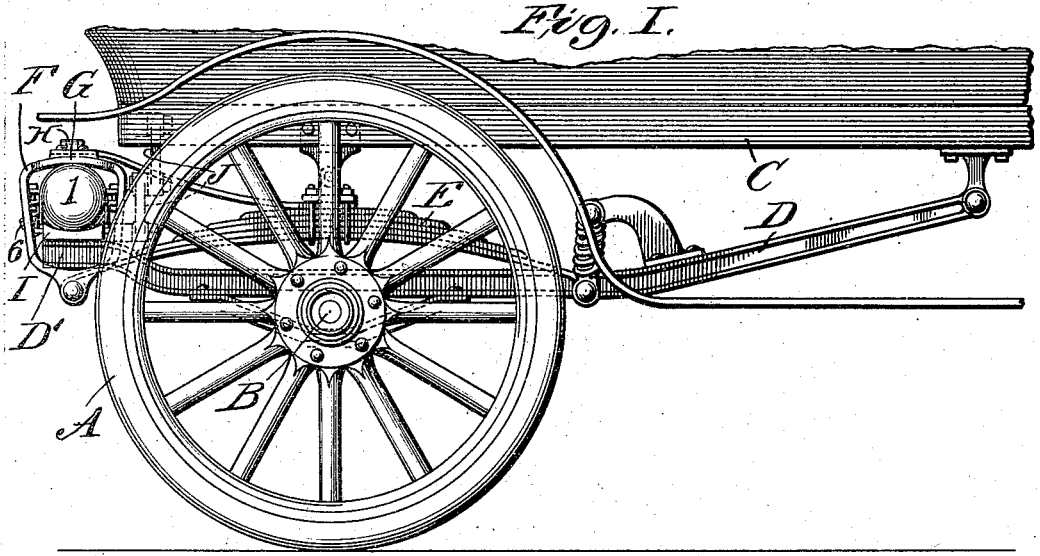
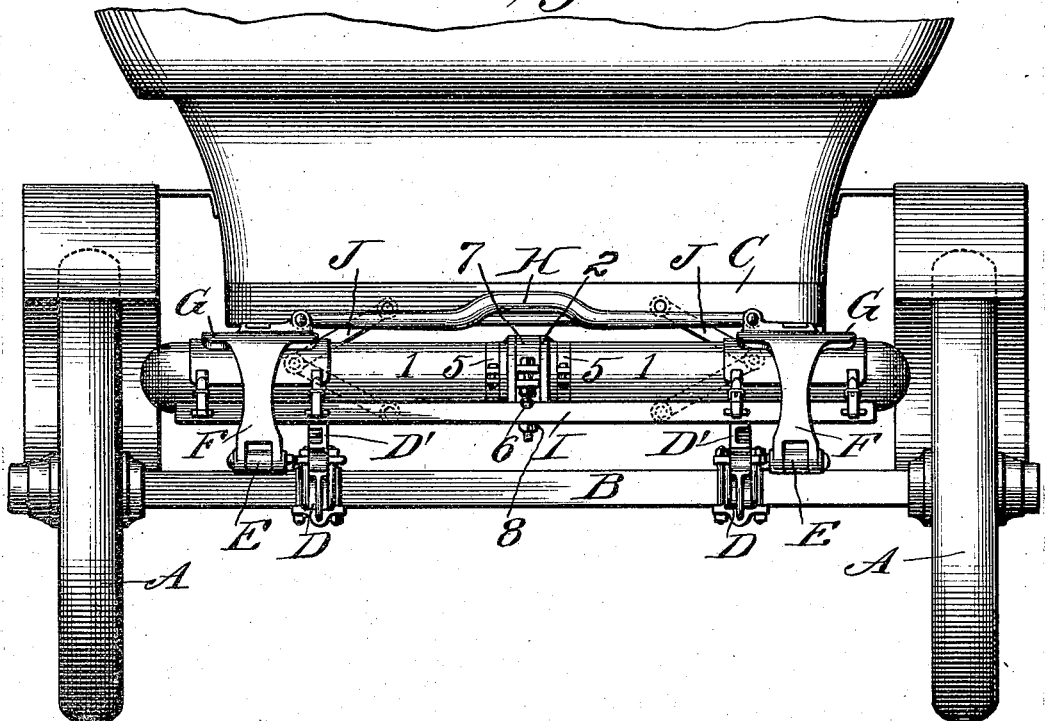
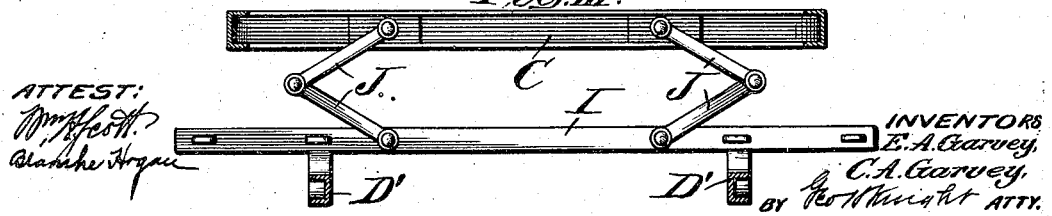
ATTEST:
INVENTORS
E. A. Garvey,
C. A. Garvey,
BY ATTY.

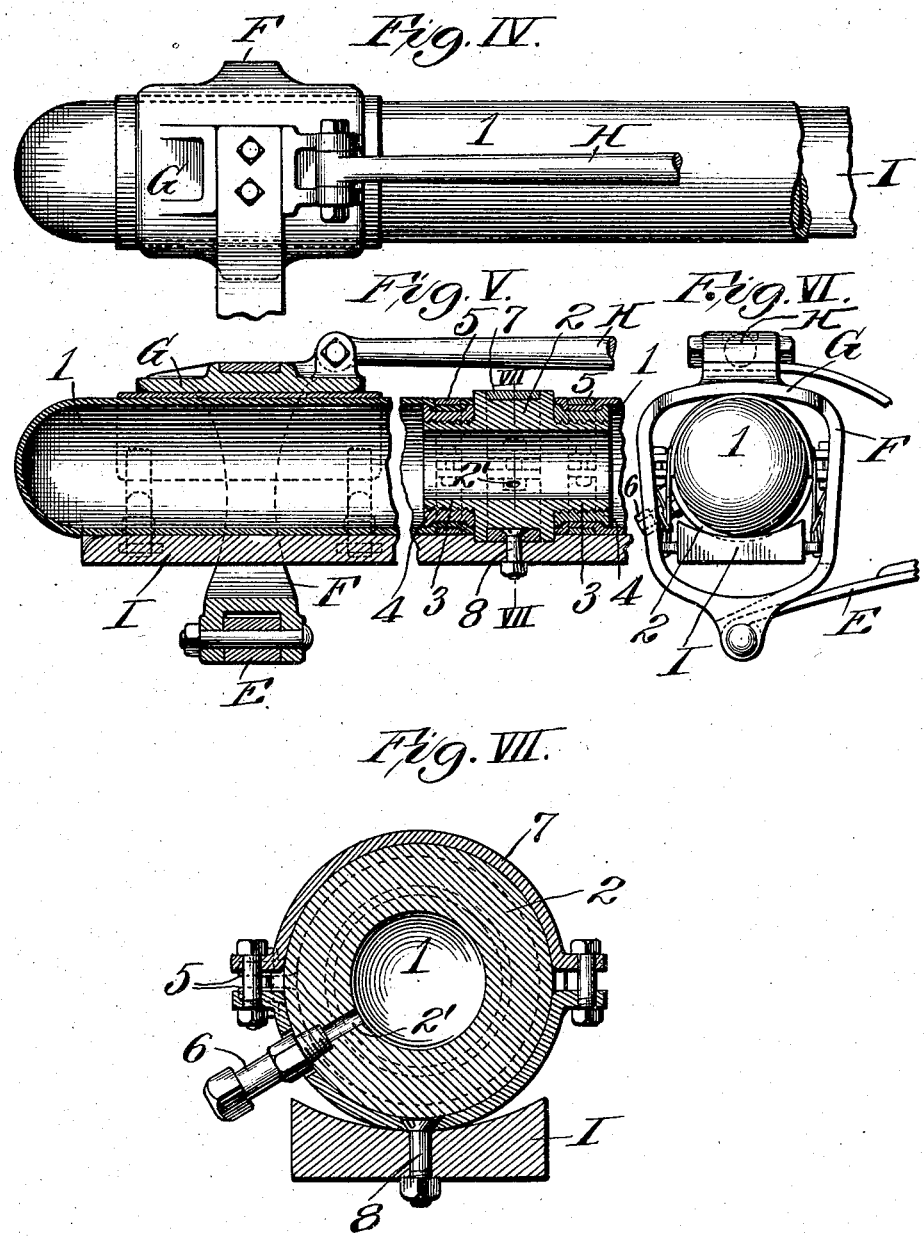

UNITED STATES PATENT OFFICE.

EDWARD A. GARVEY AND CHRISTOPHER A. GARVEY, OF ST. LOUIS, MISSOURI.

PNEUMATIC CUSHION FOR VEHICLES.

No. 894,493.　　　　Specification of Letters Patent.　　　Patented July 28, 1908.

Application filed January 9, 1908. Serial No. 409,928.

*To all whom it may concern:*

Be it known that we, EDWARD A. GARVEY and CHRISTOPHER A. GARVEY, citizens of the United States of America, residing in the city of St. Louis and State of Missouri, have invented certain new and useful Improvements in Pneumatic Cushions for Vehicles, of which the following is a full, clear, and exact description, reference being had to the accompanying drawing, forming part of this specification.

Our invention relates to a pneumatic cushion for use in vehicles as a medium for receiving the shocks to which the vehicles are subjected during their use upon roadways, and whereby the force of such shocks is minimized before being transmitted to the bodies of the vehicles.

Figure I is a side elevation of a portion of a vehicle having our shock absorbing cushion incorporated therein. Fig. II is an end elevation of the vehicle shown in Fig. I. Fig. III is an elevation of portions of the vehicle running gear and body frame, and the carrier with which our pneumatic cushion is shown associated. Fig. IV is an enlarged top or plan view of a portion of our cushion and the members of the vehicle directly associated therewith. Fig. V is an enlarged longitudinal section taken through one end of the central portion of the cushion, and the members of the vehicle directly associated with the cushion. Fig. VI is an enlarged end elevation of the cushion and the members associated with it in the vehicle. Fig. VII is an enlarged cross section taken on line VII—VII, Fig. V.

In the accompanying drawings: A designates the ground wheels of a vehicle and B an axle of the vehicle mounted in said ground wheels.

C is the vehicle body frame.

D are radial arms connected to the body frame and to the axle B and having extensions D' that extend outwardly from the axle toward the end of the vehicle.

E are the main vehicle springs attached to the body frame C and the inner arms of which are suitably connected to the radial arms D.

F are saddles connected to the outer arms of the main springs and provided at their upper ends with shoes G. These saddles are united by a bridge piece H.

I is a cushion carrier mounted upon the radial arm extensions D' and J are links connecting the body frame C to this carrier.

No invention *per se* is herein claimed for the structural features of the vehicle just described, they being set forth entirely for the purpose of showing the manner in which our tubular pneumatic cushion, which forms the subject matter of the present improvement is supported and carried in a vehicle.

Referring now to our tubular pneumatic cushion: 1 designates the inflatable sections of the cushion which are preferably two in number, so arranged, end to end, as to produce a cushion of capsular shape, each section having one closed outer end and one open inner end. The cushion sections 1 may be of rubber or any other pliable material that is sufficiently impervious or rendered sufficiently impervious to the passage of air therethrough from the interior of the cushion sections to the exterior thereof, when the cushion sections are united in the manner to be described.

2 (see Fig. V) designates a circumferentially grooved hollow main union member that is adapted to be interposed between the open inner ends of the cushion sections 1 and which is provided at its ends with reduced necks 3 that are screw threaded externally.

4 are internally screw threaded rings fitted to the screw threaded necks of the main union member and which are grooved circumferentially. The rings 4 on the necks 3 receive the cushion sections 1, the open inner ends of which are fitted over the rings on said necks and the cushion sections are secured to the rings by bands 5 that surround them and which may be tightly clamped around the open inner ends of said cushion sections by the employment of suitable means, such as bolts, as indicated in dotted lines Fig. V.

It will be seen that the union made, as described, serves to unite the cushion sections to each other in a manner to complete the pneumatic cushion for utility, so that when air is forced thereinto, the cushion sections will be inflated and will remain in an inflated condition, when the pneumatic cushion is subjected to pressure in a vehicle for shock absorbing purposes. The pneumatic cushion may be inflated by air introduced through a nipple 6 that is preferably seated in the main union member 2 and through which communication to the interior of the cushion is furnished, by the provision of a duct 2' extending to the interior of said union member.

To provide for the attachment of the pneumatic cushion to the carrier I of the vehicle, we utilize a band 7 that encircles the central portion of the main union member 2 and which may, for convenience, be composed of sections bolted together, as seen in Fig. VII. This band is preferably attached to the carrier I by a bolt 8, see Figs. V and VII.

We claim:

1. A pneumatic cushion for vehicles having a cushion-carrier, comprising a pair of cushion-sections each having an open inner end, a main coupling having necks, means for securing the open inner ends of said cushion-sections to the necks of said main coupling, and means for securing the main coupling to the cushion-carrier.

2. A pneumatic cushion for vehicles having a cushion-carrier, comprising a pair of cushion-sections each having a closed outer end and an open inner end, a main coupling having necks, means for securing the open inner ends of said cushion-sections to the necks of said main coupling, and means for securing the main coupling to the cushion-carrier.

3. A pneumatic cushion for vehicles having a cushion-carrier, comprising a pair of cushion-sections each having an open inner end, a main coupling having necks and a circumferential groove, means for securing the open inner ends of said cushion-sections to the necks of said main coupling, a band encircling and located in the circumferential groove of said main coupling, and a bolt for securing the band to the cushion-carrier.

4. A pneumatic cushion for vehicles having a cushion-carrier, comprising a pair of cushion-sections each having an open inner end, a main coupling having necks, rings having circumferential grooves and secured to the necks, clamping bands encircling and located in the circumferential grooves of said rings, for securing the open inner ends of said cushion-sections to said rings, and means for securing the main coupling to the cushion-carrier.

EDWARD A. GARVEY.
CHRISTOPHER A. GARVEY.

In presence of—
  BLANCHE HOGAN.
  LILY ROST.